United States Patent
Magielse et al.

(10) Patent No.: US 10,076,013 B2
(45) Date of Patent: Sep. 11, 2018

(54) PORTABLE LIGHT SOURCE

(71) Applicant: PHILIPS LIGHTING HOLDING B.V., Eindhoven (NL)

(72) Inventors: Remco Magielse, Tilburg (NL); Jonathan David Mason, Waalre (NL); Dzmitry Viktorovich Aliakseyeu, Eindhoven (NL); Sanae Chraibi, Eindhoven (NL)

(73) Assignee: PHILIPS LIGHTING HOLDING B.V., Eindhoven (NL)

( * ) Notice: Subject to any disclaimer, the term of this patent is extended or adjusted under 35 U.S.C. 154(b) by 0 days.

(21) Appl. No.: 15/549,026

(22) PCT Filed: Jan. 19, 2016

(86) PCT No.: PCT/EP2016/050967
§ 371 (c)(1),
(2) Date: Aug. 4, 2017

(87) PCT Pub. No.: WO2016/124390
PCT Pub. Date: Aug. 11, 2016

(65) Prior Publication Data
US 2018/0035513 A1 Feb. 1, 2018

(30) Foreign Application Priority Data
Feb. 6, 2015 (EP) .................................... 15154147

(51) Int. Cl.
H05B 37/02 (2006.01)
(52) U.S. Cl.
CPC ..... H05B 37/0227 (2013.01); H05B 37/0272 (2013.01)

(58) Field of Classification Search
CPC ............ H05B 37/0218; H05B 37/0245; H05B 37/0254; H05B 37/0281; H05B 37/0272; H05B 37/0227
USPC ........ 315/152, 160, 175, 159, 121, 291, 250
See application file for complete search history.

(56) References Cited

U.S. PATENT DOCUMENTS

| 7,242,152 | B2 | 7/2007 | Dowling et al. |
| 2010/0171430 | A1 | 7/2010 | Seydoux |
| 2010/0277295 | A1* | 11/2010 | Matthews ............... F21L 4/005 340/332 |
| 2011/0043378 | A1* | 2/2011 | Bailey ..................... G08G 1/07 340/917 |

(Continued)

*Primary Examiner* — Thai Pham
*Assistant Examiner* — Syed M Kaiser
(74) *Attorney, Agent, or Firm* — Meenakshy Chakravorty

(57) ABSTRACT

A control unit for use in a lighting system. The control unit comprises: a localization module which detects when a portable lighting device is within a predetermined vicinity of a fixed light source; and a controller which selects between different roles for the portable light source, the roles comprising (i) an independent role where the light output of the fixed and portable light sources are controlled independently of one another, and one or both of (ii) a slave role where the light output of the portable light source is adjusted in dependence on that of the fixed light source, and/or (iii) a master role where the light output of the fixed light source is adjusted in dependence on that of the portable light source. The controller is configured to switch to one of the slave role or the master role in response to the detection of the predetermined vicinity.

12 Claims, 5 Drawing Sheets

(56) References Cited

U.S. PATENT DOCUMENTS

| | | | | |
|---|---|---|---|---|
| 2011/0133655 | A1* | 6/2011 | Recker | H02J 9/02 |
| | | | | 315/159 |
| 2012/0080944 | A1* | 4/2012 | Recker | H02J 9/02 |
| | | | | 307/25 |
| 2012/0249013 | A1 | 10/2012 | Valois et al. | |
| 2012/0274775 | A1* | 11/2012 | Reiffel | G06Q 30/0241 |
| | | | | 348/158 |
| 2014/0265920 | A1* | 9/2014 | Pederson | H05B 33/0842 |
| | | | | 315/294 |
| 2016/0330825 | A1* | 11/2016 | Recker | H05B 37/0272 |

* cited by examiner

PORTABLE LIGHT SOURCE

CROSS-REFERENCE TO PRIOR APPLICATIONS

This application is the U.S. National Phase application under 35 U.S.C. § 371 of International Application No. PCT/EP2016/050967, filed on Jan. 19, 2016, which claims the benefit of European Patent Application No. 15154147.1, filed on Feb. 6, 2015. These applications are hereby incorporated by reference herein.

TECHNICAL FIELD

The present disclosure relates to controlling a portable light source in the presence of one or more fixed light sources.

BACKGROUND

In US 2010/171430 A1 a lighting device is disclosed which detects the appearance of a neighboring object and causes the light source of the lighting device to switch off. Detection of a neighboring object is performed using a radio receiver circuit at the lighting device interfacing with a radio transmitter circuit in the neighboring object.

Electronic devices are becoming ever more connected. A "connected" device refers to a device—such as a user terminal, or home or office appliance or the like—that is connected to one or more other such devices via a wireless or wired connection in order allow more possibilities for control of the device. For instance, the device in question is often connected to the one or more other devices as part of a wired or wireless network, such as a Wi-Fi, ZigBee or Bluetooth network. The connection may for example allow control of the device from one of the one or more other devices, e.g. from an app (application) running on a user terminal such as a smart phone, tablet or laptop; and/or may allow for sharing of sensor information or other data between the devices in order to provide more intelligent and/or distributed automated control.

In recent years, the number of connected devices has increased dramatically. Lighting systems are part of this movement towards a connected infrastructure. Conventional connected lighting systems consist of fixed light sources, which can be controlled through wall-mounted switches, dimmers or more advanced control panels that have pre-programmed settings and effects, or even from an app running on a user terminal such as a smart phone, tablet or laptop. For example, this may allow user to create an ambiance using a wide range of colored lighting, dimming options and/or dynamic effects. In the home environment, at least one existing system also offers consumers the possibility to implement such a connected lighting solution through retrofit bulbs that can fit into traditional light fittings.

SUMMARY

A portable light source is a lighting device that can provide its illumination function without a wired power supply, typically being battery powered by means of a battery on board the lighting device, or potentially instead being powered by another type of on-board power supply such as a manual dynamo, or even being powered using a wireless power transfer (WTF) technique based on radiative electromagnetic induction. A portable light source can thus be taken by the user from one location to the next.

The inventors envisage that one or more portable light sources could be incorporated into a connected lighting system along with one or more conventional, fixed light sources. For example, first generation products may support a control or app on a mobile user terminal enabling control of both the portable and non-portable light sources of the system, similar to existing non-portable products.

However, the current schemes for creating and recalling lighting scenes assume a fixed location of the light sources that are part of the scene. With portable lights sources on the other hand, not all of the sources in the system will bound to one location, but rather can be taken by the user to different locations to suit diverse lighting needs. Thus with the introduction of a portable light sources the creation and recalling of static and dynamic lighting scenes will need to be redefined. As some of the light points will no longer be fixed in space, then any previously created, preprogramed or otherwise predefined static or dynamic scene might create a different ambiance depending on the current locations of the portable light source(s) (whether light sources that were originally part of the scene and have now moved, or light sources that were not part of the original scene but have now been moved into the scene). Thus the interaction paradigm for interacting with such systems is changed: where traditional lighting behavior is static and confined to a predetermined set of lamps, these assumptions no longer hold. It would be desirable to provide a more user friendly control of portable lighting devices.

The following use location-based awareness of portable light sources to dynamically adjust their light settings, and/or to adjust the light settings of the surroundings. A control unit detects a portable lighting device near one or more fixed lighting devices (e.g. in the same room); and then controls the lighting devices (portable and/or fixed) based on (a) a "role" of the portable lighting device, and in embodiments (b) the "behavior" related to the light output.

The role of the portable lighting device can be any one of:
(i) master, where the portable lighting device controls the fixed lighting device(s);
(ii) slave, where the portable lighting device follows the fixed lighting device(s), or in some other way is controlled based on the fixed lighting device(s); or
(iii) independent, where the portable lighting device operates independently of the fixed lighting device(s).

In embodiments, the behavior relates to the light output (of the portable and/or fixed lighting devices), such as blending in (e.g. same color), standing out (e.g. different color) or scene based control (e.g. if a portable lighting device is in garage then it may emit bright white, functional, light, but elsewhere in the home the light may be softer and/or more atmospheric).

More generally, according to one aspect disclosed herein, there is provided a control unit for use in a lighting system, the lighting system comprising at least one fixed light source and at least one portable light source, each providing a respective light output. The control unit comprises a localization module configured to detect when the portable lighting device is within a predetermined vicinity of the fixed light source. E.g. this could mean detecting that the portable light source is within a predetermined distance of the fixed light source (e.g. a predetermined radius or predetermined distance along a path) and/or within a predetermined region occupied by the fixed light source (e.g. in the same room or zone). The control unit further comprises a controller configured to select between different roles for the portable light source with respect to the fixed light source, the roles comprising: (i) an independent role in which the light output of the portable light source and fixed light source are controlled independently of one another, and one or both of (ii) a slave role in which the light output of the portable light source is adjusted in dependence on the light output of the fixed light source, and/or (iii) a master role in which the light output of the fixed light source is adjusted in dependence on the light output of the portable light source. That is, the controller is configured with a predetermined set of at least these two or three roles for the portable light source, and is configured to select from amongst the roles of the set. Furthermore, the controller is configured to switch to one of the slave role or the master role for the portable light source in response to said detection that the portable light source is within said predetermined vicinity of the fixed light source.

The switching in response to said detection may be from the independent mode if the portable light source is not moving into the vicinity of said fixed light source immediately from the vicinity of any other fixed light sources for which a similar scheme is implemented. However, if the portable light source is coming from the vicinity of another such fixed light source, then the switching may in fact be from a slave or master mode in relation to that other, previous fixed light source, to a slave or master mode in relation to the new fixed light source of which the portable light source is newly entering the vicinity.

Note also that where is said that the controller is configured to switch to the slave or master mode for the portable light source, this means it is configured to do so on at least some occasions or in at least some circumstances (but not necessarily all circumstances or all occasions). E.g. it is not precluded that it is only configured to do so in certain modes or settings, and/or in dependence on detecting one or more additional conditions.

For instance, in embodiments the controller may be configured to select, based on a user setting, which of the slave role or the master role to switch to for the portable light source in response to said detection. Alternatively or additionally, the localization module may be configured to detect a location, orientation and/or surroundings of the portable light source; and the controller may be configured to select, in dependence on the detected location, orientation and/or surroundings, which of the slave role or the master role to switch to for the portable light source in response to said detection.

In embodiments the controller may be configured to select, based on a user setting, whether or not to switch to one of the slave role or master role for the portable light source in response to said detection (or whether to stay e.g. in the independent role).

In embodiments, in the slave role the light output of the portable light source may be adjusted to blend with the light output of the fixed light source (i.e. become more similar in terms of one or more properties), and/or in the master role the light output of the fixed light source may be adjusted to blend with the light output of the portable light source.

In embodiments, in the slave role the light output of the portable light source may be adjusted to contrast with the light output of the fixed light source (i.e. become more dissimilar in terms of one or more properties), and/or in the master role the light output of the fixed light source may be adjusted to contrast with the light output of the portable light source.

When one source light blends with another, this means its light output become more similar in terms of one or more properties, such as intensity, color or spectrum, and/or dynamic effect. Conversely, when one light source contrasts with the other, this means its light output becomes more different in terms of one or more such properties, e.g. again intensity, color or spectrum, and/or dynamic effect.

Note that where it is said that in the slave or master role, the portable light source blends or contrasts with the fixed light source, or vice versa, this means that this behavior occurs in at least some circumstances or on at least some occasions (but not necessarily all circumstances or all occasions).

For instance, in embodiments, the controller may be configured to select between different behavior types, the behavior types comprising: a first behavior type wherein in the slave role the light output of the portable light source is adjusted to blend with the light output of the fixed light source, and/or in the master role the light output of the fixed light source is adjusted to blend with the light output of the portable light source; and a second behavior type wherein in the slave role the light output of the portable light source is adjusted to contrast with the light output of the fixed light source, and/or in the master role the light output of the fixed light source is adjusted to contrast with the light output of the portable light source.

In embodiments, the controller may be configured to select the behavior type based on a user setting. Alternatively or additionally, the localization module may be configured to detect a location, orientation and/or surroundings of the portable light source; and the controller may be configured to select the behavior type in dependence on the detected location, orientation and/or surroundings.

In embodiments, the controller may be configured to select an extent of the blending and/or contrasting (i.e. the extent of said similarity or dissimilarity) based on a user setting (i.e. to select an extent to which the light output of the slave blends and/or contrasts with the master). Alternatively or additionally, the localization module may be configured to detect a location, orientation and/or surroundings of the portable light source; and the controller may be configured to select an extent of the blending and/or contrasting in dependence on the detected location, orientation and/or surroundings.

In embodiments, the localization module may be configured to receive a signal from at least one motion sensor of the portable light source to detect when the portable light source is moved (e.g. to detect when picked up by a user), and in response to become activated for performing said detection.

In embodiments, the above-mentioned control unit may be implemented at the portable light source, but it may alternatively be implemented at the fixed light source, or as part of a central control device such as a lighting system bridge. When the controller of the above-mentioned control unit selects the relevant role for the portable light source, it controls the portable light source and/or fixed light source accordingly. For the independent role and slave roles, this may mean controlling only that one of the portable light source or fixed light source in which the control unit is implemented, but for at least the master role, this means controlling both the portable and fixed light sources in some way.

In the case where the control unit is implemented at the portable light source, then in the slave role the controller receives information relating to the light output of the fixed light source from the fixed light source (either directly or via a central control device such as a lighting bridge) and adjusts the light output of the portable light source accordingly. E.g.

the information relating to the light output of the fixed light source may comprise an indication of one or more properties of the light output of the fixed light source, based on which the controller of the portable light source determines its own light output accordingly; or the information relating to the light output of the fixed light source may comprise a command to the controller of the portable light source as to how to adjust the light output of the portable light source, which a complementary controller of the fixed light source has determined based on its own light output. In the master role on the other hand, then as well as adjusting its own light output, the controller of the portable light source sends information relating to its light output to the fixed light source (either directly or via a central control device such as a lighting bridge) for a complementary controller of the fixed light source to adjust the light output of the fixed light source accordingly. Similarly to the converse scenario, this information may take the form of an indication of one or more properties of the light output of the portable light source, or a command to the complementary controller of the fixed light source.

In the case where the control unit is implemented at the fixed light source, then when the portable light source is the master, the controller on the fixed light source receives information relating to the light output of the portable light source from the portable light source (either directly or via a central control device such as a lighting bridge) and adjusts the light output of the fixed light source accordingly. E.g. the information relating to the light output of the portable light source may comprise an indication of one or more properties of the light output of the portable light source, based on which the controller of the fixed light source determines its own light output accordingly; or the information relating to the light output of the portable light source may comprise a command to the controller of the fixed light source as to how to adjust the light output of the fixed light source, which a complementary controller of the portable light source has determined based on its own light output. When the portable light source is the slave on the other hand, then as well as adjusting its own light output, the controller of the fixed light source sends information relating to its light output to the portable light source (again either directly or via a central control device such as a lighting bridge) for a complementary controller of the portable light source to adjust the light output of the portable light source accordingly. Similarly to the converse scenario, this information may take the form of an indication of one or more properties of the light output of the fixed light source, or a command to the complementary controller of the portable light source.

In the case where the control unit is implemented at a central control device such as a lighting bridge, then the controller sends information relating to the light outputs with both the portable and the fixed light source, either by sharing an indication of one or more properties of each other's light output, or by sending commands determined at the central control device.

In further embodiments, the fixed light source may contribute to a lighting scene formed by a plurality of light sources, and in the slave, said adjustment of the light output of the portable light source in dependence on the light output of the at least one fixed light source comprises adjusting the light output of the portable light source in dependence on said lighting scene.

According to another aspect disclosed herein, there may be provided a computer program product for use in a lighting system comprising at least one fixed light source and at least one portable light source, each providing a respective light output; the computer program product comprising code embodied on a computer-readable medium and configured so as when executed to perform operations of: detecting when the portable lighting device is within a predetermined vicinity of the fixed light source; selecting between different roles for the portable light source with respect to the fixed light source, the roles comprising (i) an independent role in which the light output of the portable light source and fixed light source are controlled independently of one another, and one or both of (ii) a slave role in which the light output of the portable light source is adjusted in dependence on the light output of the fixed light source, and/or (iii) a master role in which the light output of the fixed light source is adjusted in dependence on the light output of the portable light source; and switching to one of the slave role or the master role for the portable light source in response to said detection that the portable light source is within said predetermined vicinity of the fixed light source.

In embodiments, the computer program product may be further configured in accordance with any of the features of the control unit disclosed herein.

According to another aspect disclosed herein, there may be provided a method performed in relation to a lighting system comprising at least one fixed light source and at least one portable light source, each providing a respective light output; the method comprising: detecting when the portable lighting device is within a predetermined vicinity of the fixed light source; selecting between different roles for the portable light source with respect to the fixed light source, the roles comprising (i) an independent role in which the light output of the portable light source and fixed light source are controlled independently of one another, and one or both of (ii) a slave role in which the light output of the portable light source is adjusted in dependence on the light output of the fixed light source, and/or (iii) a master role in which the light output of the fixed light source is adjusted in dependence on the light output of the portable light source; and switching to one of the slave role or the master role for the portable light source in response to said detection that the portable light source is within said predetermined vicinity of the fixed light source.

In embodiments, the method may further comprise steps in accordance with any of the features of the control unit or lighting system disclosed herein.

BRIEF DESCRIPTION OF THE DRAWINGS

To assist understanding of the present disclosure and to show how embodiments may be put into effect, reference is made by way of example to the accompanying drawings in which.

DETAILED DESCRIPTION OF EMBODIMENTS

The following embodiments use a localization means, such as coded light and sensors embedded in the portable light source, in order to facilitate the addition of such light sources to a dynamic or a static lighting scene. When a portable light source is thus detected by the lighting system or detects by itself that it is in a space where a certain scene is active, the portable light source determines its role (see below) and adapts its light output and behavior accordingly. Alternatively, the portable light source might offer the user a means to define its behavior. The adaptation may be based on factors such as the position of the portable light source with respect to the one or more other light sources in the system, environmental conditions, and/or a user-defined role.

The disclosed scheme is implemented as part of a connected lighting system that can detect the presence of a portable connected light source nearby one or more other, fixed light sources. The detection may be performed based on one or more of various different possible means, such as coded light and RF signal strength.

The portable light source has at least two key decision-making components:
(a) a "role" within the location and within the lighting system, wherein the role may be that it is a master (which means that it controls the fixed lamps in that location), or a slave (e.g. it follows or copies the fixed light sources), or it is independent (decides for itself, e.g. based solely on its behavior); and optionally also
(b) a "behavior" which defines the parameters of the light output (e.g. color, intensity, saturation, dynamics, etc.) The behavior may for example be "blend in" (introvert, e.g. take average color in room) or "stand out" (extrovert, e.g. take a different color).

The end user may define the role and/or behavior of the portable light source via a user interface (UI), and/or the role and/or behavior may be dependent on one or more other factors such as the location or position of the portable light. Based on the defined role and behavior, and on the relative distance or position of the portable light source with respect to the fixed light source(s) and the currently active lighting scene, the light output of the portable light source is adjusted automatically (e.g. to adjust the color, brightness, and/or dynamic behavior of the light output). The adjustment can be fully automatic (e.g. based on a role and/or behavior predefined by the user), or semi-automatic where the user is prompted to select an appropriate behavior.

Based on the setting, in embodiments not only the light output of the portable source itself can be adjusted, but also the light output of fixed light sources can be adjusted. In the extreme case the portable light source can be used as a user input means to define or adjust the overall lighting scene.

Figure 1:
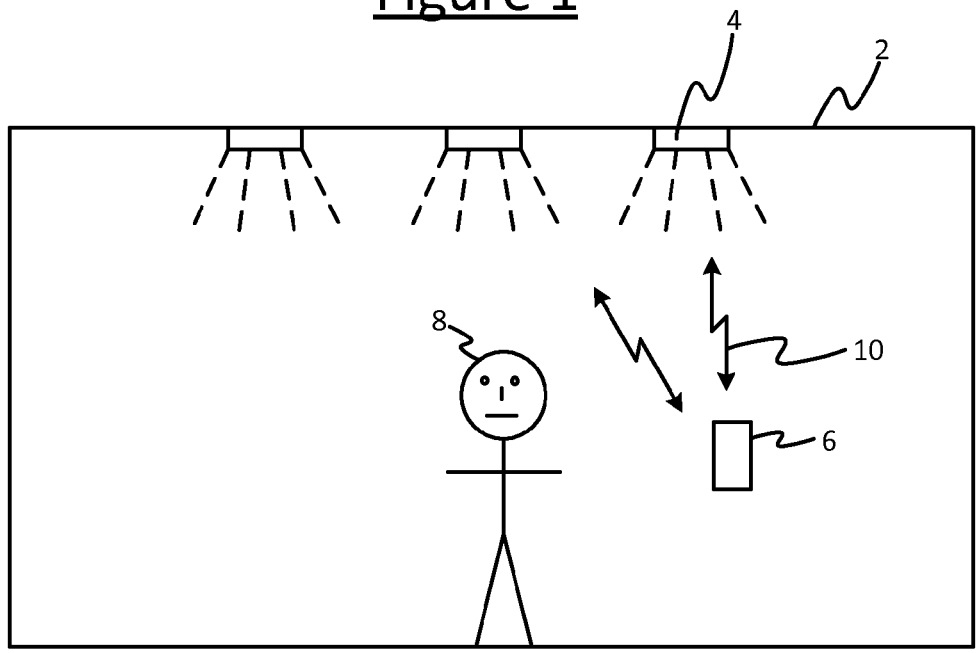
FIG. 1 is a schematic diagram of a lighting system having only fixed light sources.
Figure 2:
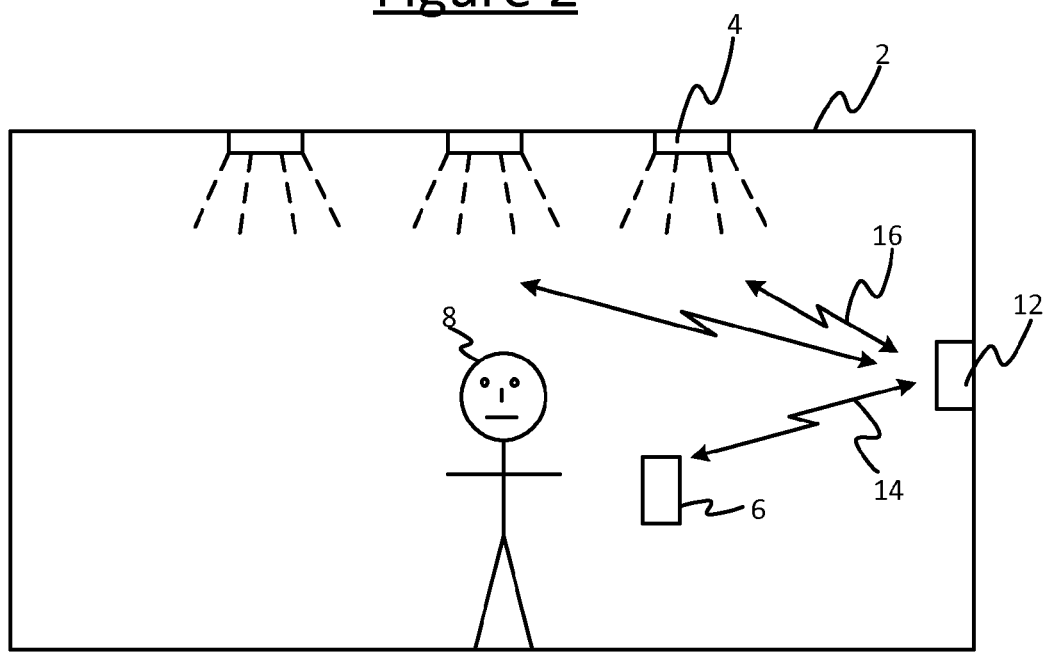
FIG. 2 is a schematic diagram of another lighting system with only fixed light sources.

FIGS. 1 and 2 show examples of a lighting system comprising one or more fixed light sources 4. The lighting system is installed in an environment 2 which may comprise an indoor space such as a room or building, and/or an outdoor space such as a garden or park, and/or a partially-covered environment such as a gazebo or stadium, and/or any other type of environment such as the interior of a vehicle. The one or more fixed light sources 4 are installed at fixed locations within the environment 2, e.g. in the ceiling and/or walls, and/or on light poles fixed to the floor or ground. Each light source 4 is a distinct lighting device in the form of a luminaire, i.e. a device for emitting illumination for illuminating the environment 2, comprising a lighting element (lamp) such as an LED, an LED string or array, a gas discharge lamp or a filament bulb, plus any associated socket, housing and/or support. The lighting system further comprises a user interface device 6, such as a light switch, dimmer switch, wall-mounted control panel, or a user terminal such as a mobile user terminal (e.g. smart phone, tablet or laptop) installed with a suitable control application ("app").

The user interface device 6 enables a user 8 to create a static or dynamic lighting scene within the environment 2. For example, in embodiments the user device 6 takes the form of a user terminal running an app through which the user 8 can adjust the color (spectrum) and/or intensity of the light as a function of space and or time, thereby allowing the user 8 to define various static or dynamic effects to create a desired atmosphere in the environment.

In order to enable the user to control the lighting through the user interface device 6, the user interface device 6 is equipped to communicate with the one or more fixed light source 4, at least to send control signals to the one or more fixed light sources 4 (directly or indirectly), and in embodiments also to receive signals such as acknowledgments and/or status reports back from the one or more fixed light sources 4.

In the embodiment illustrated in FIG. 1, the communication is implemented via a direct connection 10 between the user interface device 6 and the one or more fixed light sources, which in this context means without the involvement of an intermediate control device of the lighting system such as a lighting bridge. This connection 10 between the user interface device 10 and the one or more fixed light sources may comprise a wired connection, e.g. via an Ethernet or DMX network; and/or wireless connection, e.g. via a short-range RF technology such as Wi-Fi, ZigBee or Bluetooth. For instance, in the case of Wi-Fi, the connection 10 may be via a local Wi-Fi network and hence via a Wi-Fi router disposed in the environment 2 (not shown); or in the case of ZigBee or Bluetooth, the connection 10 may not involve any intermediate router, and may instead for example be based on a mesh network or ad-hoc connection with the one or more lighting devices 4.

In contrast with FIG. 1, in the example of FIG. 2, the lighting system does comprises a central control device 12 via which the communication and control is implemented. In the case of a lighting network, this may be referred to as a lighting bridge or just the bridge (without necessarily imply any other limitations that may be associated with the term bridge in the context of other types of network). In this case, in order to effect control, the user interface device 6 sends control signals to the bridge 12 over a first connection 14, and the bridge sends corresponding control signals to the one or more fixed lighting devices 4 over a one or more second connections 16. The one or more fixed light sources 4 may optionally also send signals back to the bridge 12 over the second connection(s) 14, e.g. acknowledgments and/or status reports, and the bridge may send corresponding signals back to the user interface device 6 over the first connection. The first and second connections 14, 16 may take the same form or different forms, and each may take any of the forms discussed in relation to the direct connection 10 in FIG. 1. E.g. in one example both the first and second connections 14, 16 are via the same local wireless technology such as Wi-Fi or ZigBee; or in another example, such as in the case of a mobile user device 6 but a wired lighting infrastructure, the first connection 14 (between user device 6 and bridge 12) may be via a local wireless technology such as Wi-Fi or ZigBee, whilst the second connection 16 (between bridge 12 and fixed light sources 4) may be via a wired network such as an Ethernet or DMX network.

Note also that the signals over the second connection(s) 16 may be communicated according to the same format, protocol and/or standard as the signals over the first connection 14; or according to a different format, protocol and/or standard. It will therefore be appreciated that where it is said herein that a given signal is communicated from one element to another, or the like, this means the underlying content or meaning is communicated, and does not necessarily limit to the same form of signal being used throughout the communication.

Figure 3:
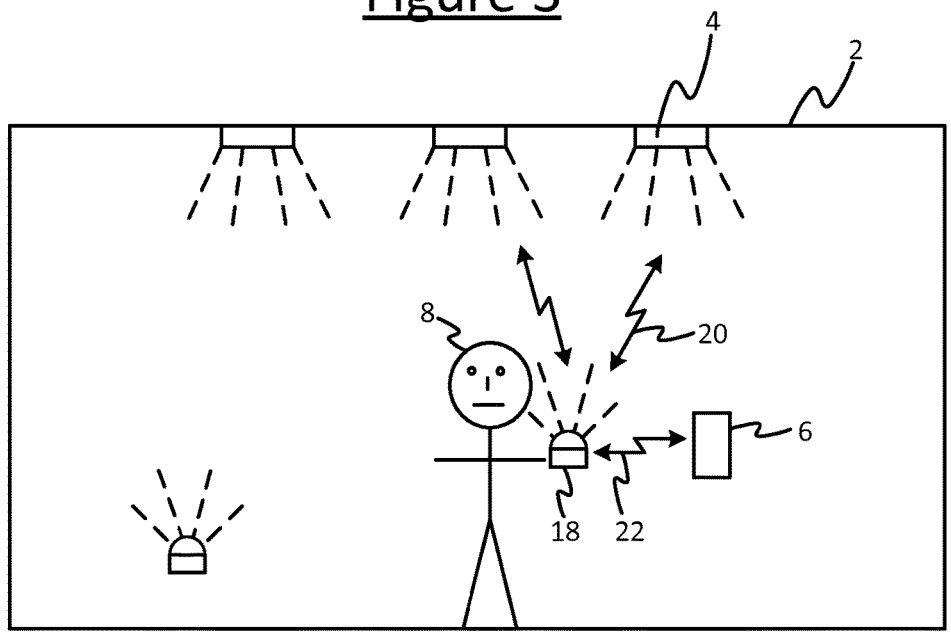
FIG. 3 is a schematic diagram of a lighting system including a portable light source.
Figure 4:
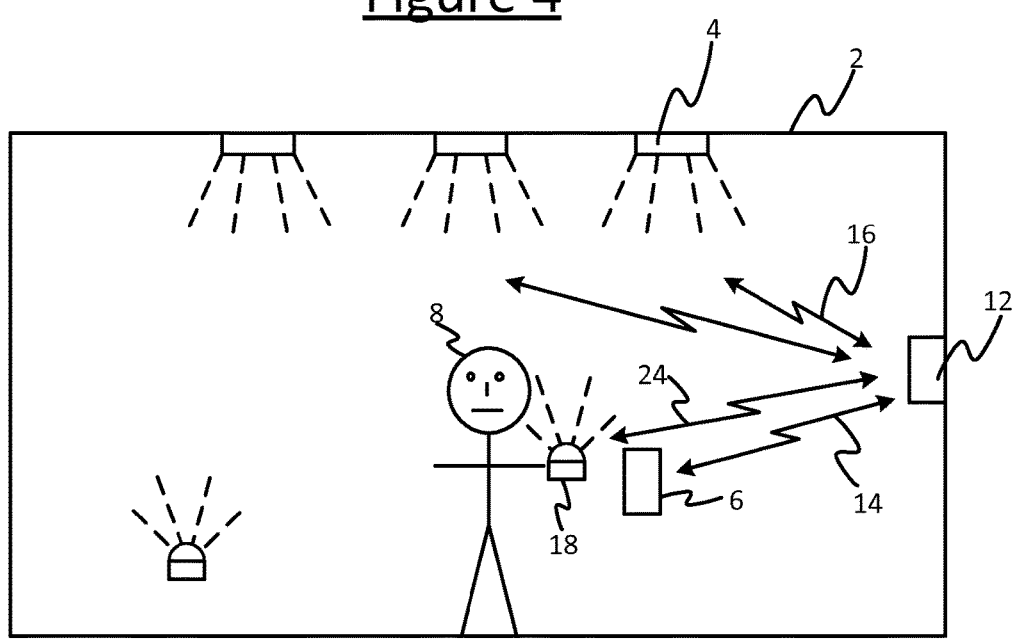
FIG. 4 is a schematic diagram of another lighting system with portable light source.

FIGS. 3 and 4 illustrate examples of a lighting system with one or more portable light sources 18 now introduced, in addition to the one or more fixed light sources 4. To enable the user input device 6 to also control the one or more portable light sources 18 as part of defining the desired lighting scene, the user input device 6 is equipped to communicate with the one or more portable light sources 18, at least to send control signals to the one or more portable light sources 18, and in embodiments also to receive signals such as acknowledgments and/or status reports back from the one or more portable light sources 18. Furthermore, to effect additional control functionality in accordance with embodiments of the present application (to be discussed further below). Again there are various possibilities for implementing these communications, either directly or indirectly.

FIG. 3 shows an example in which the communication is implemented via one or more direct connections 22 between the user interface device 6 and the one or more portable light sources 18, and/or one or more direct connection 20 between the one or more portable lighting devices 18 and the one or more fixed light sources 4. Again direct here means without the involvement of a lighting bridge 12 or other such intermediate control device. The connections 20, 22 could take the same form as one another, or a different form; and either or both may take the same form as the connection between the user interface device 6 and the fixed light source(s) 4, or a different form. Therefore these connections 20, 22 may take any of the forms discussed above in relation to FIGS. 1 and 2, for instance using a short-range RF technology such as Wi-Fi (e.g. via a Wi-Fi router), or ZigBee or Bluetooth (e.g. not involving a separate router). Another possibility for the connection between fixed and portable light sources 4, 18 is coded light (data embedded in their emitted illumination by modulating the illumination at a frequency substantially beyond human perception). The only restriction to implement the embodiments discussed below is that the connection 20 between the portable light source(s) (18) and fixed light source(s) 4 will be wireless. Preferably, the connection between the user interface device 6 and portable light source 18 is also wireless, e.g. Wi-Fi, ZigBee or Bluetooth, though it is not excluded that the control could instead be effected via a temporary wired connection with a docking station or the like. Note also that in embodiments, the user interface device 6 could be a separate device from the portable light source 4 (i.e. in separate housing), e.g. a wall-panel or mobile user terminal such as a smart phone, tablet or laptop with app; or alternatively the user interface device 6 could even be incorporated into the portable light source 18 (same housing). The following will be described in terms of a separate device, but it will be appreciated that this is not necessarily limiting.

FIG. 4 shows another example, involving a lighting bridge 12. Here, to effect the various control functions discussed herein, the communication between the user interface device 6 and the one or more portable light sources 18 may be implemented via the first connection 14 between the user interface device 6 and the bridge 12, and one or more third connections 24 between the bridge and portable light sources 18; and/or the communication between the one or more portable light sources 18 and the one or more fixed light sources 4 may be implemented via the one or more third connections between the one or more portable light sources 18 and the bridge 12, and the one or more second connections 16 between the bridge 12 and the one or more fixed light sources 4. Again any of these connections 14, 16, 24 may take the same or a different from form any of the others, and may be implemented using any of the wired or wireless means discussed above, with the only restriction being that (in this embodiment) the third connection 24 between portable light source(s) 18 and bridge 12 will be wireless.

For example, in embodiments all of the first, second and third connections 14, 16, 24 may be via the same local RF technology such as Wi-Fi, ZigBee or Bluetooth. Or in alternative embodiments, if the user interface device 6 is a mobile user terminal but the fixed light sources 4 are limited to a wired infrastructure, then the first and third connections 14, 24 (connecting the portable light source(s) 18 and user interface device 16 to the bridge 12) may be via a local RF technology such as Wi-Fi, ZigBee or Bluetooth; while the second connection 16 (connecting the fixed light source(s) 4 to the bridge 12) is via a wired network such as an Ethernet or DMX network. Or as another example, the user interface device 6 may be a wired wall panel, and only the third connection 24 (connecting the portable light source(s) 18 to the bridge) may be wireless, e.g. Wi-Fi, ZigBee or Bluetooth; while both the first and second connections 14, 16 (connecting the fixed light source(s) 4 and user interface device 6 to the bridge 12) may be wired, e.g. via an Ethernet or DMX network.

Generally, any of the features discussed herein involving communication between any combination of the user interface device 6, the one or more fixed light sources 4, and the one or more portable light sources 18 may occur via any of the means discussed above or others, or any combination of such means, and it will be appreciated that the particular means of communication between these components is not an essential factor in the disclosure.

Figure 5:
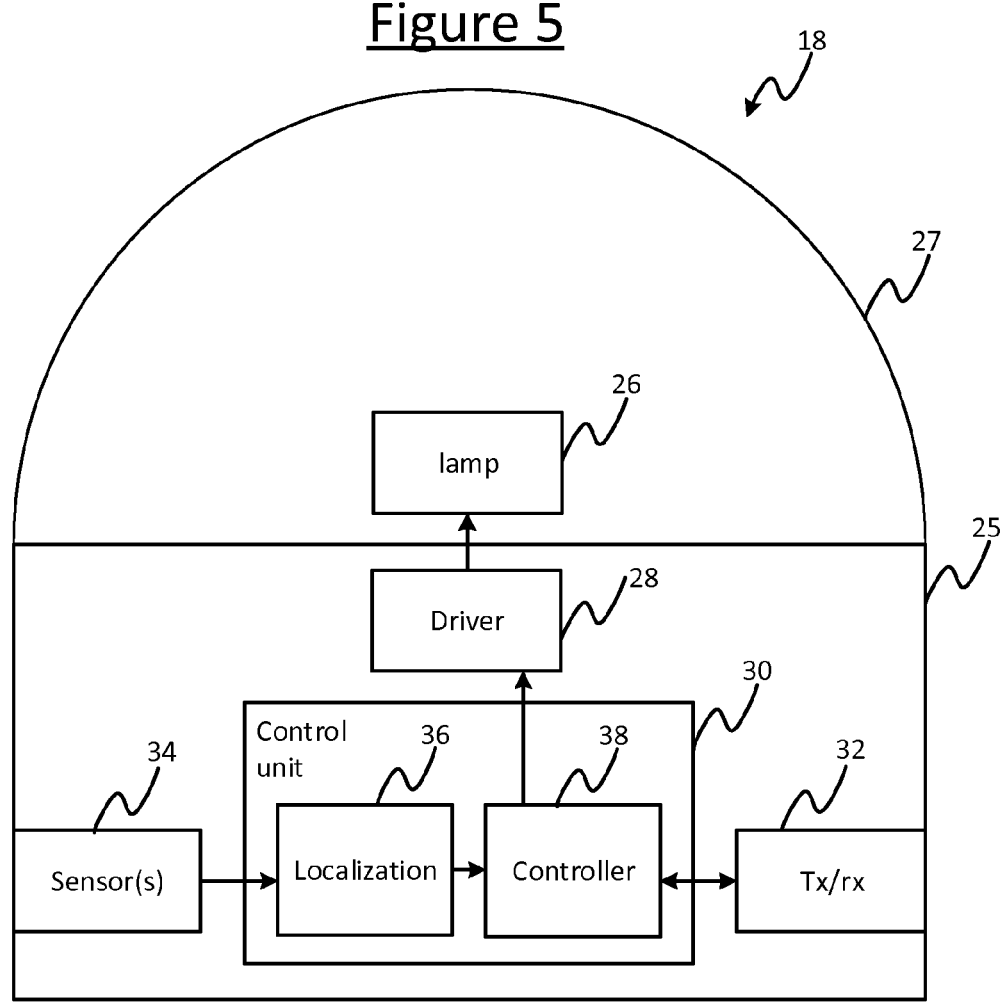
FIG. 5 is a schematic block diagram of a portable light source.
Figure 6:
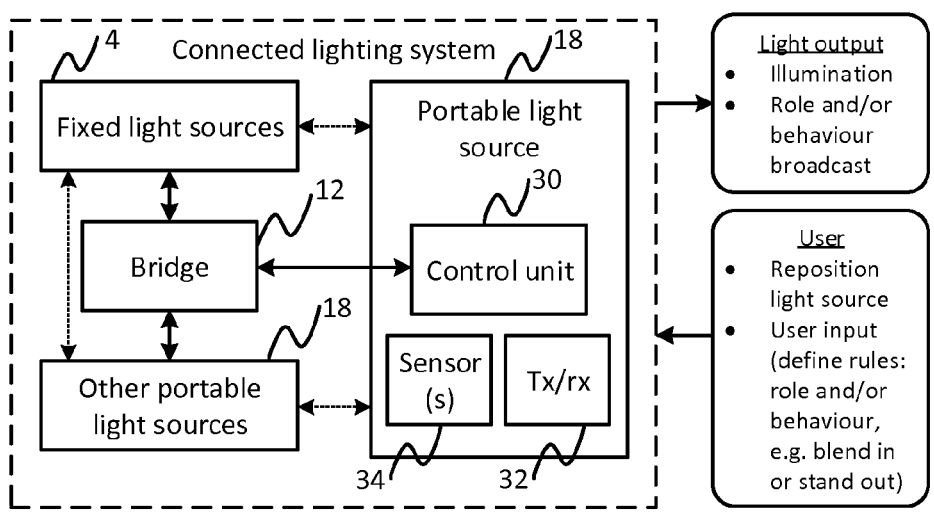
FIG. 6 is a schematic block diagram of a lighting system with portable light sources.

FIG. 5 illustrates more detail of the portable lighting device 18 in accordance with embodiments disclosed herein, while FIG. 6 provides a functional block diagram schematically illustrating how the portable light source 18 may communicate with other components within the lighting system.

Each portable light source 18 is a distinct, self-contained lighting device in the form of a portable luminaire, i.e. a device for providing illumination for illuminating the environment 2, comprising a lighting element (lamp) 26 such as an LED, an LED string or array, a gas discharge lamp or a filament bulb, plus any associated socket and/or housing 25. The housing 25 may for example comprise a diffuser 27 arranged to diffuse the illumination emitted by the lamp 26. Note that the form of the portable light source 18 shown in FIG. 5 is only illustrative, and in embodiments each of the portable light sources 18 may take various different forms (not necessarily the same as one another if there are more than one portable light source 18), such as a free-standing luminaire, wearable luminaire, hanging luminaire, or a hand-held luminaire such as a luminaire taking the form an artificial candle.

The portable light source 18 further comprises: a communications interface 32 for communicating with the user interface device 6, fixed light source(s) 4 and/or bridge in accordance with any of the techniques discussed at length above; and a control unit 30 coupled to the communications interface 32; and a driver 28 coupled between the control unit 30 and lamp 26, for driving the lamp 26 to emit illumination in dependence on signals from the control unit 30. The portable light source 18 may also comprise one or more additional sensors 34 (in addition to the interface 32), such as a light sensor and/or motion sensor (e.g. accelerometer, gyroscope and/or tilt sensor), coupled to the control unit 30.

The control unit 30 comprises a localization module 36 and a controller 38. One or both of these components 36, 38 may be implemented in the form of software code stored one or more storage media of the control unit 30 (e.g. flash memory and/or hard disk), and arranged for execution one or more processors of the control unit 30. Alternatively, one or both of these components 36, 38 may be implemented wholly or partially in the form of dedicated hardware circuitry, or in configurable or reconfigurable hardware circuitry such as a PGA or FPGA.

The controller 38 is for controlling the light output of the lamp 26 (via the driver 28), and for using the portable light source's communication interface 32 to communicate with the user interface device 6 and the one or more fixed light sources 4 (whether via the bridge 12 or directly).

The communication with the user interface device 6 comprises receiving one or more user settings from the user interface device 6 (e.g. entered by the user through an app or wall panel). The controller 38 is configured to receive these one or more user settings, and to control the light output (illumination) of the lamp 26 accordingly to contribute to creating the desired lighting scene along with the other light source(s) 4, 18. This may be a static or a dynamic (time-varying) light scene.

Furthermore, in accordance with embodiments of the present disclosure, the controller 38 is configured to use the portable light source's communication interface 32 to communicate with the one or more fixed light sources 4 in the environment 2 (or at least one of them). The controller 38 may be configured so as, when the portable light source 18 takes the master role, to use this communication channel for the controller 38 of the portable light source 18 to control one or more of the fixed light sources 4 by sending one or more messages to it/them. Alternatively or additionally, controller 38 may be configured so as, when the portable light source 18 takes the slave role (e.g. on a different occasion or in different circumstances), to use this communication channel for the controller 38 of the portable light source 18 to be controlled by one or more of the fixed light sources 4, by receiving messages from it/them.

Optionally, the controller 38 may also use the interface 32 to communicate with one or more other portable light sources 19 if present in the environment 2 (see FIG. 6). This communication could also occur via any of the wired means discussed above in relation to FIGS. 3 and 4, e.g. via a short-range RF technology such as Wi-Fi, ZigBee or Bluetooth.

The localization module 36 is configured at least to detect when the portable light source comes within a predetermined vicinity of one or more of the fixed light sources 4. This may be achieved in a number of ways. For example, in embodiments, the one or more fixed light sources 4 each emit a coded light signal (i.e. a signal embedded in their illumination at high frequency), and the one or more sensors 34 comprise a light detector (e.g. photocell or camera) for detecting the signals. In this case, the localization module 36 may determine a positive detection of vicinity on condition of the coded light signal exceeding a threshold signal strength, or on condition of successfully decoding a certain ID or other such data conveyed by the coded light signal.

As another example, the one or more sensors 34 could comprise a sensor for detecting beacon signals from anchor nodes of a dedicated indoor positioning network, e.g. RF, infrared or ultrasound beacon signals. In this case, the localization module 38 may be configured to use the beacons to perform a positioning calculation such as a triangulation, trilateration, multilateration or fingerprinting process in order to detect coordinates of the portable light source 18, e.g. on a map or floor plan. The localization module 36 will then determine a positive detection of vicinity based on the coordinates of the portable light source relative to known coordinates of one or more of the fixed light sources 4, e.g. on condition that the coordinates of the portable light source 18 fall within a predetermined radius or a predetermined distance along a path relative to the one or more fixed light sources 4, or are determined to fall within a same predefined region, such as the same room or a same zone of an indoor or outdoor space.

As yet another example, the localization module 36 may not use a separate sensor 34, but could use the communication interface 32 of the portable light source 18 to detect vicinity to the one or more fixed light sources 4. For instance, the localization module 36 may detect when an RF signal such as a Wi-Fi beacon or other Wi-Fi, ZigBee or Bluetooth signal from one or more fixed light sources 4 exceeds a certain threshold signal strength; or it may perform a location calculation such as a triangulation, trilateration, multilateration or fingerprinting to calculate the coordinates of the portable light source 18 based on multiple RF signals such as Wi-Fi beacons or other Wi-Fi, ZigBee or Bluetooth signals from multiple different ones of the fixed light sources 4 and/or other such RF nodes, and then compare with known coordinates of the one or more fixed light sources 4. As yet another example, a location calculation such as a triangulation, trilateration, multilateration or fingerprinting could be performed based on coded light signals from the fixed light sources, or based on signals from cell towers of a mobile cellular network such as a 3GPP network.

It will be appreciated that these are just examples, and various other localization technologies will be familiar to a person skilled in the art, where such technologies may be readily adapted to detect the relative vicinity of a portable light source 18 and fixed light source 18. Combinations of the above and/or other techniques could also be used to improve accuracy.

When the localization module 36 detects that the portable light source 18 has indeed entered the vicinity of one or more of the fixed light sources 4, it signals this to the controller 38, which is configured so as in response to control the portable light source 18 to become either the master of the slave of the one or more fixed light sources 4 (before that it may have either been independent, or the master or slave of another one or more fixed light sources 4). Examples of this will be discussed in more detail below.

Note that the term "localization" as used herein does not limit to any specific type or accuracy of determination and in its broadest sense may be no more limiting than determining whether the portable light source 18 is within a predetermined vicinity of one or more fixed light sources 4. Note also that being within a predetermined vicinity may be judged in a number of ways. For example, the portable light source 18 may be determined to be within the vicinity of a fixed light source 4 on condition that it is detected to be within a certain radius of that fixed light source 4, or within a certain distance along a path (e.g. along a path that a user might take along on a floor plan). As another example, the portable light source 18 may be determined to be within the vicinity of a fixed light source 4 on condition that it is found to be a same predefined region, e.g. the same room, or the same zone within an indoor or outdoor space.

Thus, in embodiments, "localization" may mean no more than detecting that a signal from one or more of the fixed lights sources 4, such as a coded light signal, RF signal or ultrasound signal, exceeds a threshold; or detecting that the portable light source 18 is in the same room as one or more fixed light sources 4, or the like.

Nonetheless, in some embodiments, the localization module 36 may also be configured to determine more information about the location of the portable light source 18, such as its location within the environment 2 (e.g. coordinates on a), its orientation within the environment 2, and/or to detect one or more features of the surroundings encountered in the environment 2. This may be used to automatically control what role (slave, master or independent) the portable light source 18 will adopt in what scenario, and/or what behavior it will exhibit in one or more of these roles in the relevant scenario. Such an automatic adaptation of the role and/or behavior may be used as an alternative or in addition to user settings for defining the role and/or behavior.

Some example control schemes that may be implemented based on the system of FIGS. 1 to 6 will now be discussed in more detail, with the controller 38 adapting the light output (illumination) from the lamp 26 based on the detection by the localization module 36, and optionally also based on one or more user settings and/or one or more items of further information on the location, orientation and/or surroundings of the portable light source 18 detected by the localization module 36.

Figure 7:
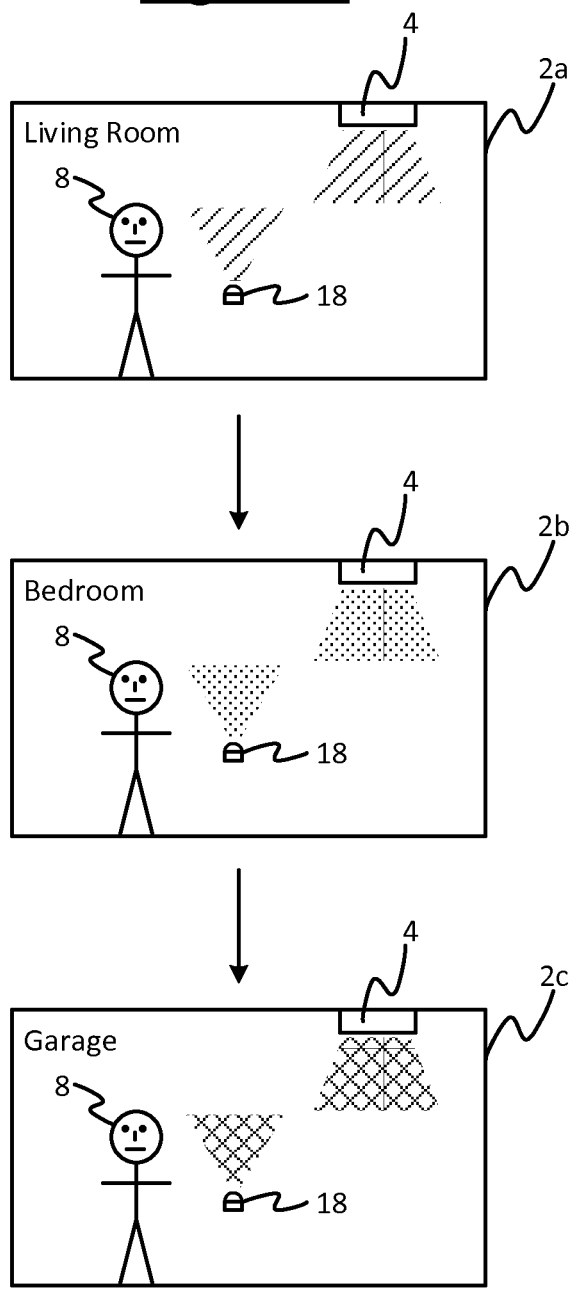
FIG. 7 is schematically illustrates a role and behavior of a portable light source.

A first exemplary story is described in relation to FIG. 7, to showcase how the portable light source 18 may adopt light settings when it is placed in a location where there are already other lights 4 enabled. E.g. the portable light source 18 has a user-defined role "slave" and behavior "copy" or "blend in".

Andy sits in the living room 2a, reading the newspaper. There is an article about yoga practice, which reminds him that he hasn't done his exercises yet. He picks up his portable light source 18 and goes to the bedroom 2b, where his wife Cynthia was just browsing some magazines. As Andy places the portable light source 18 in the bedroom 2b, it adjusts to the light settings of the bedroom 2b as the device is set to follow (slave mode).

Later that day, Andy goes to the garage 2c, to work on his old-timer. He switches on the fixed light sources 4 in the garage 2c to a cool-white light. After some time, Andy has to work underneath the car. He brings his portable light source 18 into the garage to illuminate his work environment. When he places it in the garage, the portable light source 18 adopts the functional white lighting conditions.

This story shows how the role of the portable light source 18 is subservient (slave role) to the other fixed lights 4, and how when in the different locations 2a-2c it blends in with the scenes of those fixed light sources 4 (its behavior).

A second exemplary story is described below, showcasing how the portable light source 18 can alternatively be used to enable lights 4 in another location. E.g. the portable light source 18 has a user defined role "master" and behavior "copy me".

Simon is reading the newspaper at the coffee table before he has to leave for work. He uses his 'morning light': a nice sunrise scene. He usually has a few minutes to browse the headlines, while his wife is using the bathroom. In a few minutes he has to wake up his two children, to dress them and bring them to school. Simon picks up his portable light source 18 and takes it to the bedroom of his daughter Mary. As he enters the room of Mary, he places the portable light source 18 on the ground. The lights in Mary's room adopt the sunrise scene. He wakes up his little girl, bathes her and dresses her. Meanwhile, his wife Ann has picked up the portable light source and placed it in on the ground of the room of Frank, their son. Here, also the sunrise scene is activated. As Frank leaves for work, he places the portable light source 18 at the kitchen table, where—as he knows—in a few minutes the other family members will eat their breakfast.

This second story shows the portable light source in a more dominant role, where the fixed lights 4 must follow or copy to fall in with its behavior. As an extra point, note that in this example, the light output is also dependent on the position of the light (in this case height).

The disclosed concepts can be embodied in various diverse ways. In embodiments, the portable light 18 could be a part of the connected lighting system with a bridge 12 as a main control point, or it can be more of an ad hoc system where the lights could communicate with each other without a central hub (see FIG. 6). In some embodiments, one or more sensors 34 of the portable light source 18 may comprise a motion detection technology (e.g., accelerometer, light sensors, camera, gyroscope, altimeter etc.) in order to detect when it is picked up and placed down and in response activate the vicinity detection process. Furthermore, the portable light source 18 will have some means 36 to detect its distance to nearby light sources 4 and means 32 to communicate with those light sources. E.g. this can be achieved through measuring the signal strength of RF messages (RSSI), through coded light, via light sensors, or via camera vision, as discussed above. For example, in embodiments, whenever the portable light source 18 is placed down, an RF or coded light signal may be transmitted to surrounding light sources 4 to determine its relative location (in case of a lighting system with a bridge 12 the processing of these communications may be done at the bridge 12 or in the cloud); or the portable light source 18 may listen for RF or coded light signals from other light sources 4 in order to determine its relative location. The light level and/or color of the surrounding light source(s) 4 can also be communicated in these RF or coded light signals, for the purpose of adapting the light output of the potable light source 18. Alternatively, in embodiments, the portable light source may use a light sensor or camera vision 34 to detect the intensity and/or color of surrounding light sources and thereby adapt its own color accordingly. In this case, the light source 18 does not necessarily need to be (instantly) connected to the other light source(s) 4 in order to adapt to its/their light output. For example if the behavior of the portable light source 18 is set to blend in, and its camera detects that the color of surrounding light sources is green, then it can turn green itself without receiving or waiting for any extra information from surrounding the light source(s) 4 or a central hub 12.

By whatever means the detection of proximity and the adaptation of the light output are implemented, note that in embodiments this can work on the move as the portable light source 18 is being transported: the light output can adjust en-route. I.e. the control described herein is dynamic, adapting to on-going or real-time movement of the portable light source 18.

Figure 8:
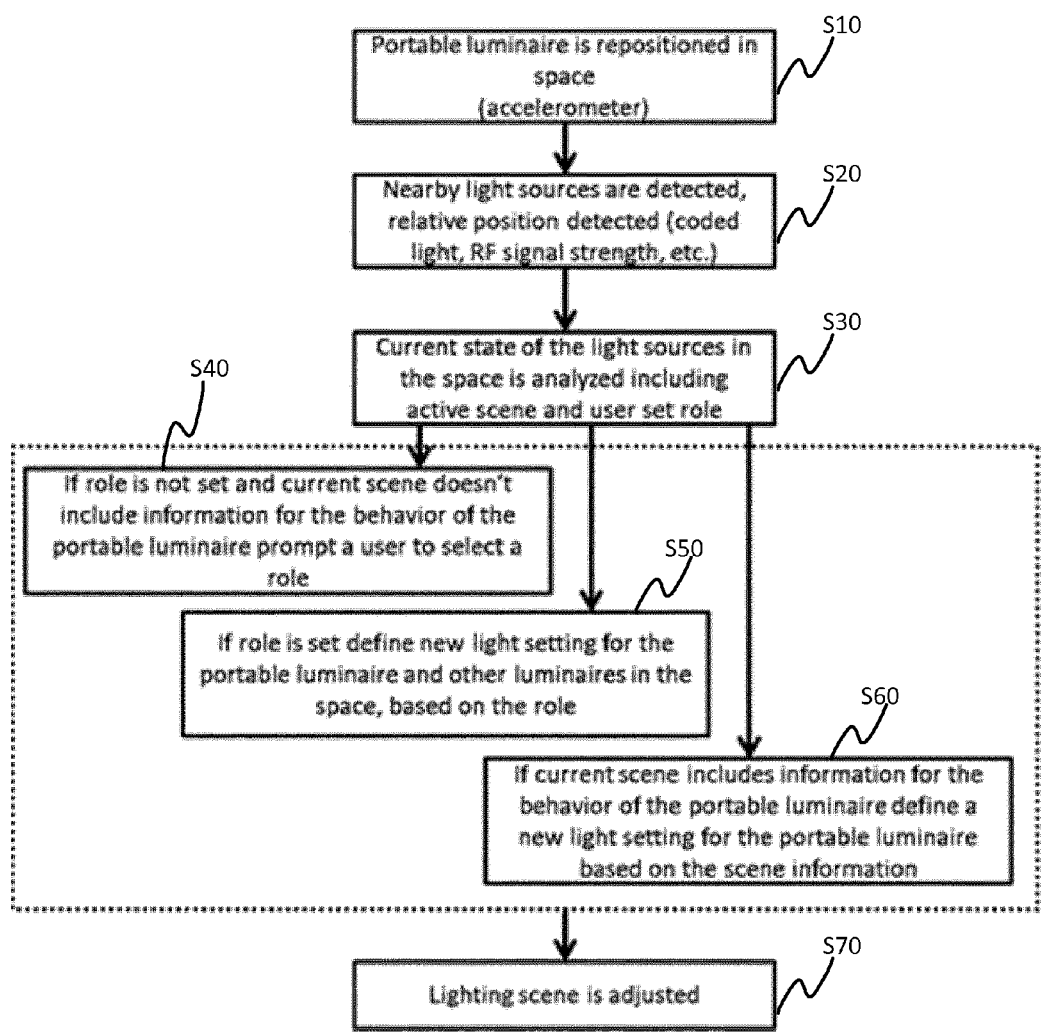
FIG. 8 is a flow chart of a method of operating a portable light source.

As the relative location of the portable light source 18 is then known to the lighting system, it can adjust the behavior of the portable light 18 as well as of fixed lights 4 based on the user defined role, desired behavior, and/or the current state of the fixed light source(s). A flow chart describing this process is given in FIG. 8. In embodiments, this process is performed by the control unit 30 on the portable light source 18.

At step S10, the portable light source 18 is repositioned in space (e.g. and this is detected by an accelerometer or other motion sensor on the portable light source 18). At step S20 (in embodiments in response to the detection by the motion sensor), nearby light sources 4 are detected and the position of the portable light source 18 relative to these is also detected. E.g. this step could be based on coded light, RF signal strength, etc., as discussed above. At step S30, a current state of the detected light sources 4 in the space is analyzed, which may comprise determining a user set role and/or behavior, and/or whether the current scene provides any information as to what role the portable light source 18 should take or how it should behave. At step S40, if the role is not set and/or the current scene doesn't include information for the behavior of the portable light source 18, the user may be prompted to select a role and/or behavior (e.g. via the user interface device 6). If on the other hand a predefined role and/or behavior has already been set by the user 8, a new light setting is selected for the portable light source 18 and/or other light source(s) 4, depending on the user-defined role (whether the portable light source 18 is master, slave or independent) and behavior (e.g. blend in or stand out). Alternatively or additionally, if the current scene includes information which is to define the role and/or behavior of the portable luminaire 18 (possibilities discussed in more detail later), then a new light setting is selected for the portable light source 18 and/or other light source(s) 4 based on the scene information. At step S70 the light output is adjusted accordingly.

Examples of such adaptations are as follows.

The portable light 18 may adopt the same light settings as the nearest other light source 4 (role: "slave", behavior: "copy" or "blend in").

If light state information is known for this location (e.g. this information might have been entered during the scene creation), for example, whether the controller 38 has knowledge about one or more light settings that it should have for the current scene, then these settings may be activated (role: "slave", behavior: "adjustment").

The portable light source 18 may load its own current light settings to the nearest other light source(s) 4 (role: "master", behavior: "copy").

The portable light source 18 may load the scene information to the nearest other light source(s) 4 (role: "master", behavior: "adjustment").

Note that where it is said that light output of the portable light source 18 is adjusted in dependence on the light output of at least one fixed light source 4, or the like, in embodiments this may in fact comprise fitting to a whole lighting scene to which the fixed light source 4 contributes, rather than just blending with the light output of the one, specific individual fixed light source 4. For example, if there are three fixed light sources 4 outputting light to create an underwater scene, the when the portable luminaire 18 is brought in in mode "blend in, slave", then the portable luminaire 18 blends in not based on the exact colors of the individual light sources 4, but rather based on the underwater scene settings as a whole, and its relative to location to the fixed light sources 4. As another example, multiple light sources 4 may create a rainbow scene, with different ones of the fixed light sources 4 at different positions outputting light with a different respective color in the rainbow, e.g. one red, one green and one violet. If a portable luminaire 18 is introduced in mode "blend in, slave" at a position between the red and green fixed light sources 4, then it will adapt its light output to be yellow in order to fit in between these fixed light sources; or if moved to a position between the green and violet fixed light sources 4, then the portable light source will change to blue to fit in between these. Also, in these example the relation is spatial, but this does not necessarily need to be a case. For example in the "underwater scene", fixed light sources may be blue but settings of the scene might be that any portable light source 18 should be colored orange to represent fish if in the "slave, contrast" mode. Note also that where it is said that light output of the portable light source 18 is adjusted in dependence on the light output of at least one fixed light source 4, or the like, this does not necessarily mean the portable light source has to derive its new setting directly from the fixed light source 4. Another possibility is that the portable light source derives its new setting from a central controller such as the bridge 12 which controls the fixed light source 4.

As most connected lighting systems have some application interface (e.g. app on the user interface device 6) for people to setup and control the lighting system, the user 8 can be offered control over the behavior of the portable light source 18.

The user defined role and behavior for the portable light source 18 are properties that will define its light settings, as well as settings of the light sources 4 nearby. Here are several examples of how this can be represented in the UI (e.g. the UI presented via user interface device 6).

The roles and/or behavior may be fixed, may be controlled automatically, or may be partially or fully user defined. For example in the user defined case, the user 8 might give a "master" role to one of the portable lamps 18, which means when it is moved to the space all nearby light sources 4 should behave in a similar way, so if the user selects "blend in" all light sources should take colors similar or close to the color of the portable light source. If instead the user would set a role "slave", the same behavior will cause the portable light source to change its color to blend in into a scene created by the nearby light sources 4.

In some embodiments, the UI might allow input as to a user preference for the degree to which the light output should blend in or stand out (or similar) within the location.

In embodiments using automated selection of role and/or behavior, the location of the portable light source 18 relative to the fixed light source(s) 4 may determine the role and/or behavior of the portable luminaire light source 18, e.g. is it master or slave, bold, shy or sneaky (this may depend on other personality-based inputs such as to "stand out" rather than "blend in" with the location). Or, when close to a fixed light source, the portable light source 18 may be more subservient, whereas if out on its own it may take more control and decide with more 'freedom of choice' what output to provide.

Alternatively or additionally, role may be automatically defined based on the sequence of switching on the fixed light source(s) 4 with respect to when the portable light source 18 was introduced, e.g. this may determine a hierarchy of control. For instance the light source 4, 18 that was turned on or introduced first is the master of all subsequently turned on or introduced light sources 4, 18, and perhaps each subsequent source is a slave to its predecessor(s) and master of any further subsequent sources 4, 18.

As another example, as well as or in addition to the location of the light, the orientation of the portable light source 18 may be a factor used in the automated control of role and/or behavior. For example, when the portable light source 18 is placed facing a wall, different light settings may be loaded than when it is placed on a table. For instance, placing the portable light source 18 on a table facing the space with its users (possibly moving around) could cause the lighting to adapt in a dynamic pattern, e.g. with transitions in saturation, brightness and/or color; whereas turning the lamp around to face the wall may exclude it (at least to some extent) from the group, e.g. which could adapt the light effect of the portable light source 18 according to a more gentle behavior.

As yet another example, what could happen is that the portable light source 18 has no direct control but looks around it for inspiration as to what setting(s) it can apply. Using one or more of various possible sensors, it can look around itself and then use that data repeatedly to adjust the light output. One aspect of control can be how the lamp should use these data, for example how much it should it blend in with or stand out from the current light scene. Based on the location of the portable light source 18, it can judge what light output it should provide. Place it near a green shrub and it can either blend in with green light and a gentle dynamic to mimic the shrub moving in the wind, or it can be told to stand out and it will select opposing colors on the spectrum and a sharp and pointy dynamic. These blends may be degrees on a scale (and thus variable). As such, the light output from portable light source 18 may be automatically determined.

In some embodiments, the options presented by the user interface (action possibilities) may be adapted based on the location of the portable light source 18, e.g. different available lighting scenes are presented to the user in his or her interface. As many connected lighting systems are controlled through smart devices (i.e., tablets, smartphones, wearables), this interface can be adjusted based on information of the portable light source 18: for example, other scenes are offered.

In another such example, the portable light source 18 may assess the surrounding location and suggest to the user 8 what role it should take: the user 8 can then select the one he or she likes. In each location or position the selection sent to the user 8 will differ. The UI could also be based on behavior or personality—thus the selection may be shy, bold, sneaky, excited and so on, and each will use the input data differently to assess and judge a suitable output. This user experience could be meaningful: a shy lamp will blend in, a proud lamp will want to fit in well, a bold lamp will want to stand out, whilst a naughty lamp will not confirm to the others, and/or a sneaky lamp will conform but then try to change to other settings.

In yet another example, the sensing of RF communications or presence around the portable and/or fixed light source(s) 4, 18 (i.e. activity of people) may be used to determine which behaviors could be most applicable—e.g. there is little point in being bold if there is nobody around to see; but likewise, no point in being shy if no-one is present either.

Use of a portable light source 18 may also imply that the user interface device 6 may take the form of a portable platform 6, which can potentially operate with or without an external bridge 12. Portable lights 18 could be charged and/or controlled using the app on this portable platform 6, including potentially doing so while away from the home via the bridge 12 if connected via a suitable wide area network such as the Internet and/or a mobile cellular network (e.g. 3GPP network). For instance, this could be used to avoid the need to linking the portable light source(s) 18 temporarily to another person's bridge (e.g. when the user takes his or her portable light source(s) 18 to a BBQ at a friend's house).

It will be appreciated that the above embodiments have been described only by way of example.

For instance, whilst the above has been discussed in terms of a control unit 30 implemented in the portable light source 18, in alternative embodiments the control unit 18 could be implemented in one or more of the fixed light sources 4, or in a central control device such as the bridge 12, in which cases the controller 38 controls the portable light source 18 (when its role is as a slave) by sending signals to it via the portable light source's communication interface 32 (e.g. via a local RF technology such as Wi-Fi, ZigBee or Bluetooth).

Further, while some concepts disclosed herein may have been described in terms of a single or given portable light source and a single or given fixed light source 4, in embodiments the teachings herein can also extend to detecting when the portable light source 18 is in the vicinity of more than one fixed light source 4, and/or when it is also in the vicinity of one or more other portable light sources 18 as well as the one or more fixed light sources 4; and in response switching to a certain role. E.g. this may be judged by detecting the distance of the portable light source 18 to an average position of the multiple other light sources 4, 18; or detecting when all the relevant light sources 4, 18 are in the same region (e.g. same room or zone). Furthermore, whether detecting vicinity to one or more other light sources 4, 18, the portable light source in question may become a master or a slave to a plurality of fixed light sources 4, and/or a master or slave to one or more other portable light sources 18 as well as the one or more fixed light sources 4. E.g. in the case of multiple portable light sources 18, this decision could be based on a user setting as to which portable light source 18 should dominate, or a predefined protocol (e.g. the portable light source 18 that entered the relevant vicinity first is the master).

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfill the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention claimed is:

1. A control unit for use in a lighting system that comprises at least one fixed light source and at least one portable light source, each providing a respective light output; the control unit comprising:
   a localization module configured to detect when the portable lighting device is within a predetermined vicinity of the fixed light source; and
   a controller configured to select between different roles for the portable light source with respect to the fixed light source, the roles comprising (i) an independent role in which the light output of the portable light source and fixed light source are controlled independently of one another, and (ii) a slave role in which the light output of the portable light source is adjusted in dependence on the light output of the fixed light source;
   wherein the controller is configured to switch to the slave role for the portable light source in response to said detection that the portable light source is within said predetermined vicinity of the fixed light source;
   wherein in the slave role the light output of the portable light source is adjusted to become more similar or dissimilar to the light output of the fixed light source in terms of one or more properties,
   wherein the controller is configured to select between different behavior types, the behavior types comprising:
   a first behavior type wherein in the slave role the light output of the portable light source is adjusted to become more similar to the light output of the fixed light source in terms of one or more properties, or in a master role the light output of the fixed light source is adjusted to become more similar to the light output of the portable light source in terms of one or more properties; and
   a second behavior type wherein in the slave role the light output of the portable light source is adjusted to become more dissimilar to the light output of the fixed light source in terms of one or more properties, or in the master role the light output of the fixed light source is adjusted to become more dissimilar to the light output of the portable light source in terms of one or more properties.

2. The control unit of claim 1, wherein the controller is configured to switch to the slave role for the portable light source in response to said detection.

3. The control unit of claim 1, wherein the controller is configured to switch to the master role for the portable light source in response to said detection.

4. The control unit of claim 1, wherein the controller is configured to select, based on a user setting, which of the slave role or the master role to switch to for the portable light source in response to said detection.

5. The control unit of claim 1, wherein the localization module is configured to detect a location, orientation or surroundings of the portable light source; and the controller is configured to select, in dependence on the detected location, orientation and/or surroundings, which of the slave role or the master role to switch to for the portable light source in response to said detection.

6. The control unit of claim 1, wherein the controller is configured to select the behavior type based on a user setting.

7. The control unit of claim 6, wherein the localization module is configured to detect a location, orientation or surroundings of the portable light source; and the controller is configured to select the behavior type in dependence on the detected location, orientation and/or surroundings.

8. The control unit of claim 1, wherein the controller is configured to select an extent of said similarity or dissimilarity based on a user setting.

9. The control unit of claim 1, wherein the localization module is configured to detect a location, orientation or surroundings of the portable light source; and the controller is configured to select an extent of said similarity or dissimilarity in dependence on the detected location, orientation or surroundings.

10. The control unit of claim 1, wherein the fixed light source contributes to a lighting scene formed by a plurality of light sources, and in the slave role, said adjustment of the light output of the portable light source in dependence on the light output of the at least one fixed light source comprises adjusting the light output of the portable light source in dependence on said lighting scene.

11. The control unit of claim 1, wherein the localization module is configured to receive a signal from at least one motion sensor of the portable light source to detect when the portable light source is moved, and in response to become activated for performing said detection.

12. A computer program product for use in a lighting system comprising at least one fixed light source and at least one portable light source, each providing a respective light output; the computer program product comprising code embodied on a non-transitory computer-readable medium and configured so as when executed to perform operations of:
   detecting when the portable lighting device is within a predetermined vicinity of the fixed light source;
   selecting between different roles for the portable light source with respect to the fixed light source, the roles comprising (i) an independent role in which the light output of the portable light source and fixed light source are controlled independently of one another, and (ii) a slave role in which the light output of the portable light source is adjusted in dependence on the light output of the fixed light source; and
   switching to the slave role for the portable light source in response to said detection that the portable light source is within said predetermined vicinity of the fixed light source,
   selecting between different behavior types, the behavior types comprising: a first behavior type and a second behavior type,
   wherein in the slave role the light output of the portable light source is adjusted to become more similar or dissimilar to the light output of the fixed light source in terms of one or more properties; and
   wherein in the first behavior type in the slave role the light output of the portable light source is adjusted to become more similar to the light output of the fixed light source in terms of one or more properties, or in a master role of the light output of the fixed light source is adjusted to become more similar to the light output of the portable light source in terms of one or more properties; and where in in the second behavior type in the slave role the light output of the portable light source is adjusted to become more dissimilar to the light output of the fixed light source in terms of one or more properties, or in the master role the light output of the fixed light source is adjusted to become more dissimilar to the light output of the portable light source in terms of one or more properties.

* * * * *